Aug. 18, 1931.  M. C. SHERMAN  1,819,486
HOPPER CONSTRUCTION
Filed May 26, 1926  2 Sheets-Sheet 1
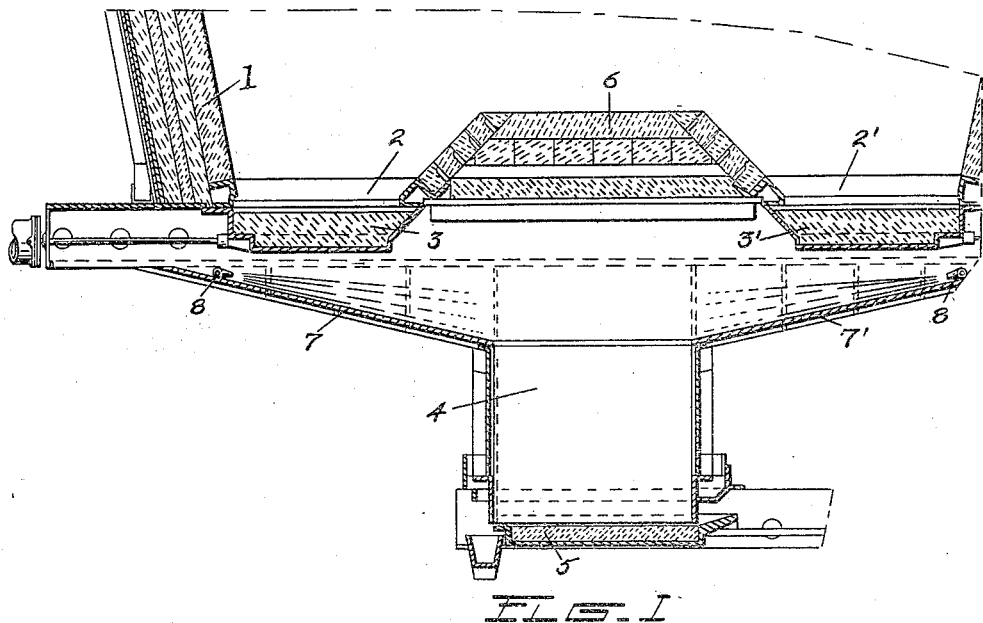
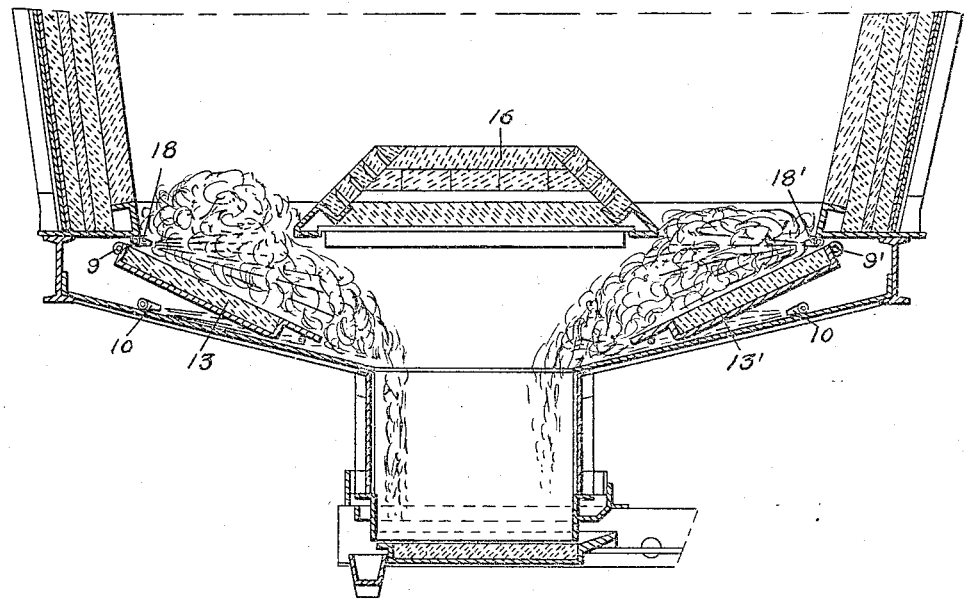
Inventor
Max C. Sherman
By Richey Watts
Attorneys Aug. 18, 1931.　　M. C. SHERMAN　　1,819,486
HOPPER CONSTRUCTION
Filed May 26, 1926　　2 Sheets-Sheet 2

Inventor
Max C. Sherman
By Richey and Watts
Attorneys

Patented Aug. 18, 1931

1,819,486

UNITED STATES PATENT OFFICE

MAX C. SHERMAN, OF BALA-CYNWYD, PENNSYLVANIA, ASSIGNOR, BY MESNE ASSIGNMENTS, TO THE ALLEN-SHERMAN-HOFF COMPANY, OF PHILADELPHIA, PENNSYLVANIA, A CORPORATION OF PENNSYLVANIA

HOPPER CONSTRUCTION

Application filed May 26, 1926. Serial No. 111,749.

This invention relates to an improved furnace construction. More particularly it relates to an improved construction for disposing of furnace residues.

It is customary to dispose of furnace residues by discharging them from a furnace bottom into a receptacle disposed directly beneath the discharge opening of the furnace bottom. However, with the advent of modern high temperature furnaces the intense heat of the furnace has rapidly destroyed the material of the receptacle and necessitated frequent repairs thereof. The applicant has discovered that the radiant heat of the furnace has effected to a marked extent this rapid destruction of the walls of the receptacle and that if the furnace residue disposal system is shielded from the radiant heat its life is prolonged and the necessity of lining the same with refractory material is avoided.

The applicant has devised a furnace construction taking cognizance of the fact that radiant heat waves travel in straight lines and has positioned the furnace hopper out of the path of radiant heat issuing from the mass of burning fuel in the furnace.

It is an object of the invention to provide an improved furnace construction in which the residue hopper is positioned out of alignment with the mass of burning fuel and the discharge opening of the combustion chamber. Other objects will be apparent from the specification and from the accompanying drawings in which:

Fig. 1 is a longitudinal sectional view through a combustion chamber and residue disposal system.

Fig. 2 is a longitudinal sectional view of a modified form of combustion chamber and residue disposal system.

Figure 3:
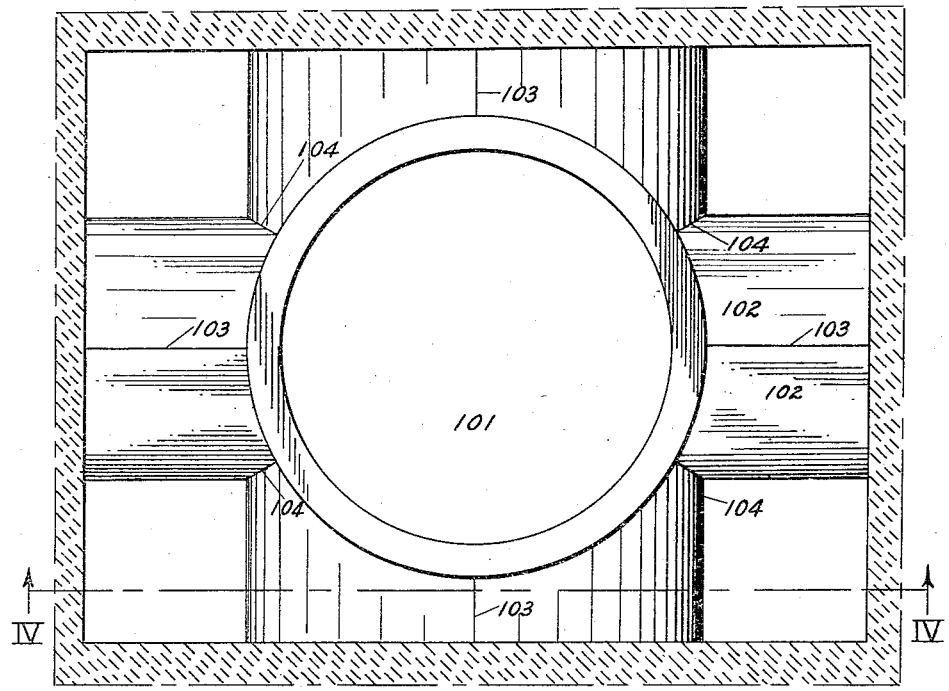
Fig. 3 is a horizontal section through a third form of furnace combustion chamber showing the residue disposal system.

Referring particularly to Fig. 1 the device comprises a combustion chamber 1 having spaced discharge openings 2 and 2' disposed in the bottom wall 6 of the combustion chamber. The openings 2 and 2' are adapted to be closed by the doors 3 and 3' respectively which are mounted for movement across the openings. Below the discharge openings is situated a transfer hopper 4, the bottom of which is closed by a sliding door 5. The transfer hopper is situated intermediate the discharge openings and directly under the centrally upwardly projecting dividing wall 6 which shields the transfer hopper from the radiant heat of the furnace fire in combustion chamber 1. Inclined metal feed transfer plates 7 and 7' are disposed beneath the discharge openings of the combustion chamber to receive the ashes passing therethrough and from which these ashes slide down into the transfer hopper.

The transfer plates are normally shielded from the heat of the furnace fire in chamber 1 by the doors and by wall 6 so that no part of the transfer hopper assembly is exposed to the radiant heat of the furnace. Water may be introduced through nozzles 8 into the transfer hopper and these nozzles are conveniently arranged near the upper end of the transfer plates, as shown, so that the cooling water assists in carrying the ashes into the transfer hopper. This movement of the ashes down the transfer plates while being submitted to the spray from the nozzles permits thorough quenching of the ashes so that they are comparatively cool and dustless when they reach the transfer hopper. As the doors of the furnace discharge openings are never opened simultaneously with the doors of the transfer hopper discharge openings, very little heat can escape from the furnace and very little air is admitted through these openings. Automatic means may be provided if desired to prevent opening the transfer hopper discharge door when the other doors are open.

The transfer hopper, being shielded by the doors 3 and 3' and the wall 6, need not be made of heat resisting material such as is necessary for the combustion chamber, and is illustrated in this figure as having no refractory lining at all.

The hopper shown in Fig. 2 is very similar to that of Fig. 1, except that doors 13 and 13' have been provided at the hopper discharge openings. These doors are pivoted to the combustion chamber frame at their outer ends as indicated at 9 and 9'. The inner ends may be depressed to allow the ashes to slide down the doors and into the transfer hopper. The nozzles 18 and 18' have been situated in the hopper opening so that the cooling water may assist in carrying the ashes from the doors 13 and 13' to the transfer hopper.

As indicated at the left hand side of the figure, the ashes in the lower part of the combustion chamber accumulate on the top of the door and, as the angle of repose thereof is greater than the angle formed between the horizontal and a line connecting the inner edge of the door and the inner edge of its discharge opening, the ashes completely close this opening and prevent air entering the furnace therethrough.

The wall 16 shields the transfer hopper from the radiant heat of the furnace fire in the combustion chamber, in a manner similar to that described in connection with Fig. 1. The doors 13 and 13' may be raised to close the hopper discharge openings and lowered when ashes are to be discharged or maintained in the inclined position shown and the ashes dependent upon to shield the opening, the same being carried from the door by the water projected from nozzles 18 and 18'. Additional jets 10 may be provided to remove any ashes accumulating on the feed plate underlying the combustion chamber discharge opening.

Figure 4:
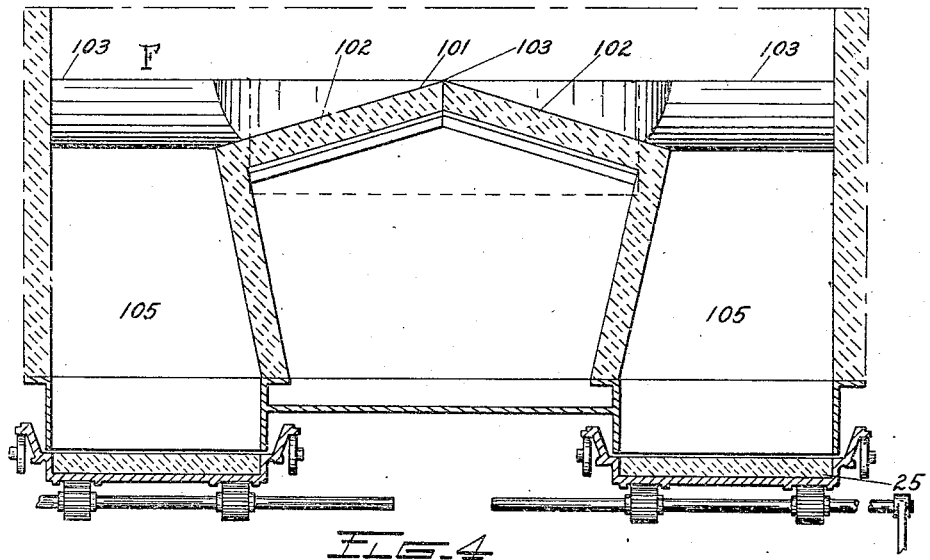
Fig. 4 is a vertical sectional view taken along the line 4—4 of Fig. 3.

In Figs. 3 and 4 the furnace is indicated generally at F and comprises a central combustion chamber 101 which is shown as a cylindrical depression in the furnace bottom with the upper open face thereof constituting a discharge opening. The fuel is preferably blown into the combustion chamber and after burning the residues are normally blown out of the chamber. The furnace bottom surrounding the combustion chamber is composed of slanting surfaces 102 which form ridges 103 and grooves 104 at their intersections. At or near each corner of the furnace bottom is positioned a hopper 105. It will be seen that the radiant heat from the fire in the combustion chamber extends upwardly and outwardly therefrom, and that the furnace bottom throughout a large part of its surface and the transfer hoppers are in the shadow cast by the wall surrounding the combustion chamber. Of course, the combustion chamber and transfer hoppers could be arranged in many other ways to cast a shadow upon the transfer hopper walls.

By shielding the interior of the transfer hopper from the radiant heat of the furnace, its temperature may be maintained considerably below that prevailing in the interior of the furnace. This comparatively low temperature not only prevents deterioration of the transfer hopper walls but permits the safe introduction of water to quench the ashes so that these may be delivered in a relatively cool and dustless condition to the conveying means by which they are taken to their point of disposal. Moreover, the cooling of the ashes prevents their fusion with the disadvantages attendant upon such a fusing.

While I have described a few embodiments of my invention in some particularity, obviously many other variations and modifications thereof will occur to those skilled in the art and I do not, therefore, limit myself to the precise details herein described but claim as my invention all such variations and modifications falling within the scope of the subjoined claims.

I claim:

1. In furnace construction, a combustion chamber having a bottom discharge opening and adapted to contain a mass of burning fuel in the portion of said combustion chamber lying above said discharge opening, a movable closure for said opening, a hopper offset laterally from the discharge opening whereby the hopper is positioned out of alignment with the said portion of the chamber and the discharge opening, a transfer plate for conducting into the hopper residues discharged through the discharge opening, means for flushing the residues from the closure, and means for flushing the residues from the transfer plate into the hopper.

2. In furnace construction, a combustion chamber having a bottom discharge opening and adapted to contain a mass of burning fuel in the portion of said chamber lying above said discharge opening, and a hopper having a discharge opening, said hopper being offset laterally from the combustion chamber discharge opening whereby the hopper is positioned out of alignment with said portion of the chamber and the chamber discharge opening and means for directing materal discharged through said discharge opening into said offset hopper.

3. In furnace construction, a combustion chamber having a bottom discharge opening and adapted to contain a mass of burning fuel in the portion of said chamber lying above said discharge opening, a movable closure for said opening, a hopper offset laterally from the discharge opening whereby the hopper is positioned out of alignment with the said portion of the chamber and the discharge opening, means for conducting residues from the discharge opening to the hopper and means for flushing material from said closure.

4. In furnace construction, a combustion chamber having a bottom discharge opening and adapted to contain a mass of burning fuel in the portion of said chamber lying above said bottom discharge opening, a movable closure for said opening, a hopper having a bottom discharge opening, a movable closure for said hopper discharge opening, said hopper being offset laterally from the combustion chamber discharge opening, a transfer plate for conducting into the hopper residues discharged through the combustion chamber discharge opening, means for flushing the residues from the combustion chamber closure and means for flushing the residues from the transfer plate into the hopper.

In testimony whereof I hereunto affix my signature this 18th day of May, 1926.

MAX C. SHERMAN.